L. A. PECKHAM.
SHOCK ABSORBING DEVICE.
APPLICATION FILED NOV. 6, 1909.

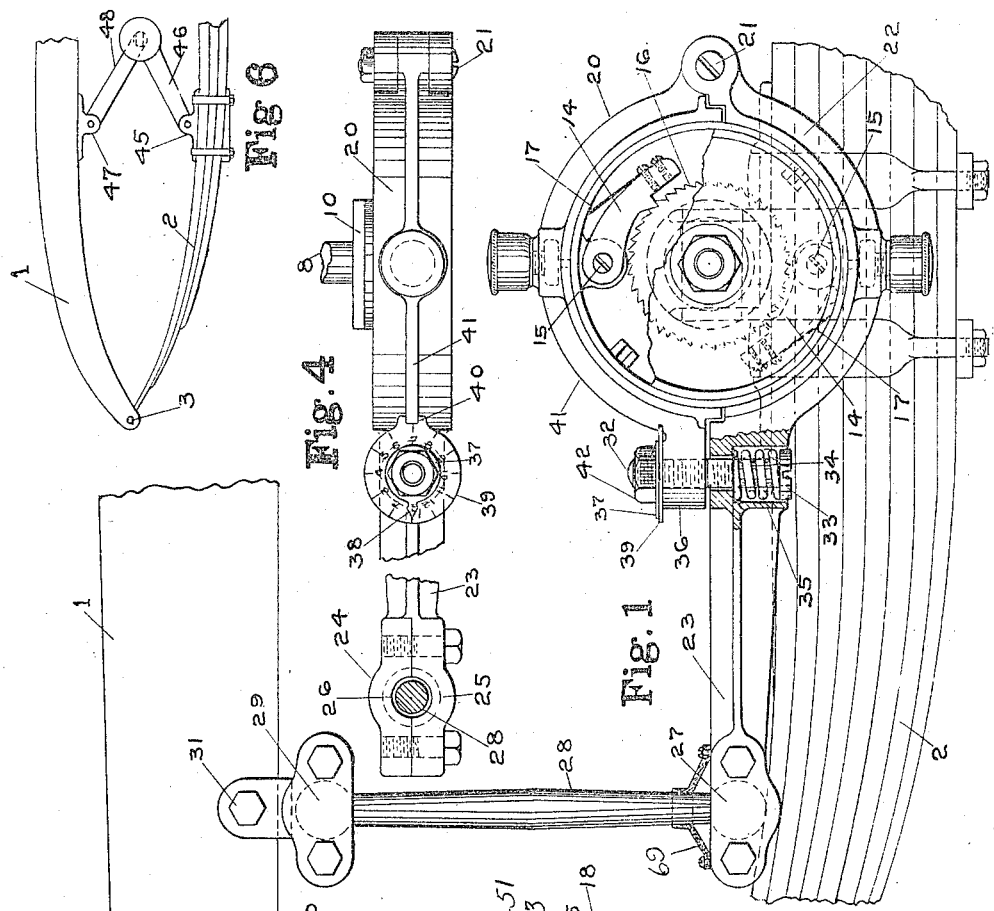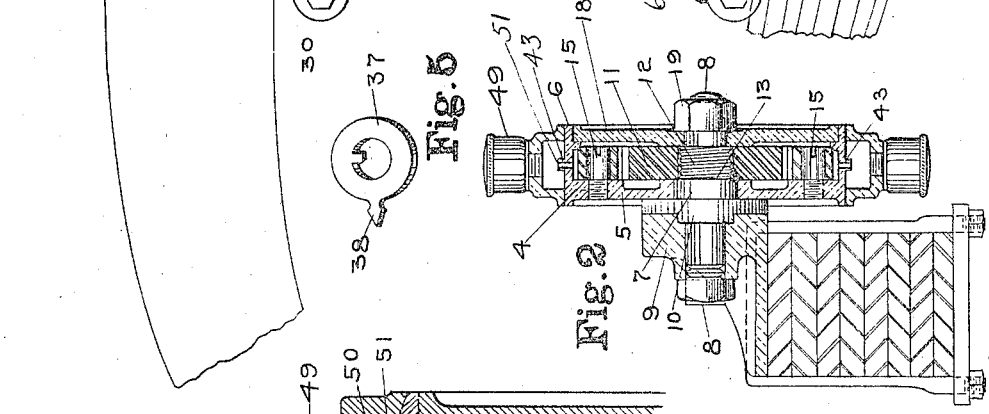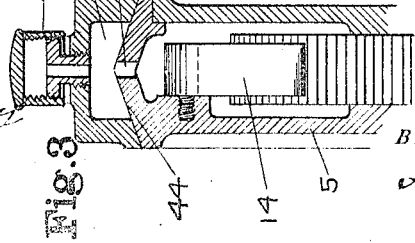

989,407.

Patented Apr. 11, 1911.

2 SHEETS—SHEET 2.

WITNESSES:
John T. Corley
E. D. Ogden

INVENTOR.
Luther A. Peckham
BY
Howard E. Barlow
ATTORNEY.

UNITED STATES PATENT OFFICE.

LUTHER A. PECKHAM, OF EDGEWOOD, RHODE ISLAND

SHOCK-ABSORBING DEVICE.

989,407.

Specification of Letters Patent.

Patented Apr. 11, 1911.

Application filed November 6, 1909. Serial No. 526,524.

*To all whom it may concern:*

Be it known that I, LUTHER A. PECKHAM, a citizen of the United States, residing at Edgewood, in the town of Cranston, in the county of Providence and State of Rhode Island, have invented certain new and useful Improvements in Shock-Absorbing Devices, of which the following is a specification, reference being had therein to the accompanying drawings.

This invention relates to devices adapted to be attached to automobiles, railroad cars, or other road vehicles where the body of the same is supported on springs.

An object of the present invention is to provide an efficient device of simple and practical construction that may be readily attached to a vehicle and arranged to allow the springs to be depressed without resistance, but to nicely control the upward movement of the spring supported body and permit the same to return slowly and easily to its normal level after each sudden depression due to some unevenness in the road. By the employment of this device the springs are prevented from breaking from sudden shocks and jars, and the passengers are protected from sudden upward jerks or throws which are bound to occur, particularly while riding rapidly over rough roads in vehicles where the movement of the spring is not controlled. Then again, the upward throw of the vehicle body has a tendency to temporarily relieve the weight and reduce the wheel traction, permitting the wheels to rotate and slip on the ground, wearing the tires and greatly increasing the danger of skidding.

A further object of the invention is to provide a friction surface drum for receiving a friction band, which drum is adapted to rotate slightly in one direction at each vertical movement of the vehicle body, being held against a retrograde or backward movement by a ratchet or other similar or suitable device whereby the friction drum is continually changing its position circularly, thereby equally distributing the frictional wear around its working surface.

A still further object of the invention is to provide means whereby my improved shock absorber may be readily adjusted so as to offer any desired degree of frictional resistance to the upward movement of the springs.

With these and other objects in view, the invention consists of certain novel features of construction, as will be more fully described and particularly pointed out in the appended claims.

Figure 7:
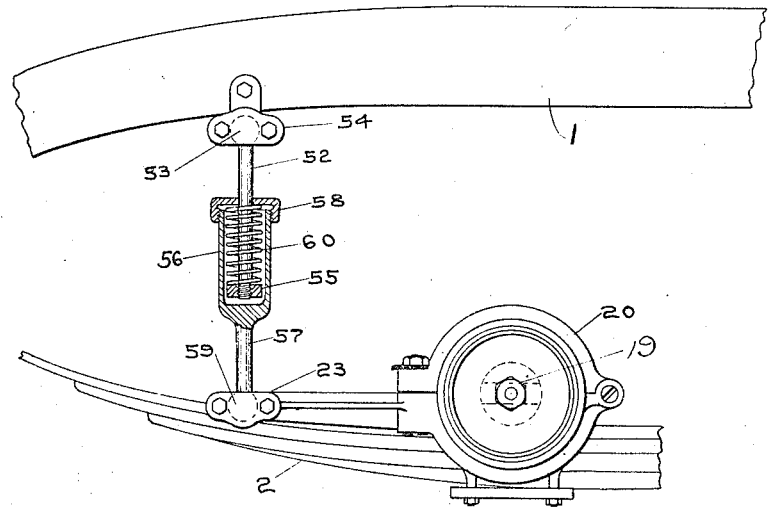
Figure 8:
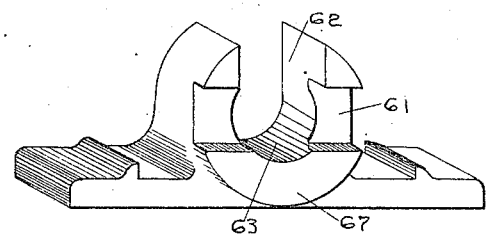
Figure 9:
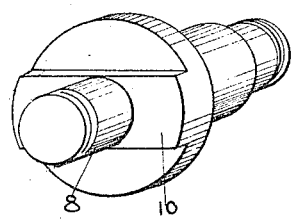
Figure 10:
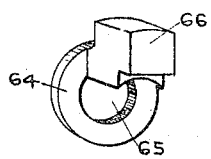
Figure 11:
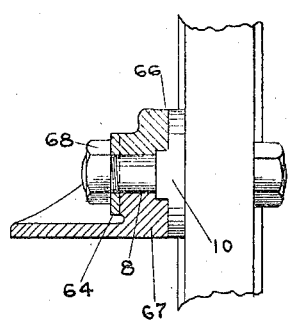

In the accompanying drawings: Figure 1— is a side elevation, partly in section, illustrating my improved shock absorber as attached to the spring, while the friction arm is loosely connected to the frame of the vehicle. Fig. 2— is a central sectional end elevation through the drum and vehicle spring. Fig. 3— is an enlarged view illustrating another form or shape of frictional face about the drum and strap. Fig. 4— is a top view of the friction strap as illustrated in Fig. 1, showing the graduated tension plate. Fig. 5— is the pointer washer for indicating the degree of tension. Fig. 6— is a modified arrangement whereby the friction drum is suspended by two arms, one from the vehicle frame and the other from the bracket over the axle of the vehicle. Fig. 7— illustrates a yielding connection member between the spring supported vehicle body and the shock absorbing device. Fig. 8— is a perspective view of the improved bracket for receiving and retaining the drum supporting stud. Fig. 9— is a perspective view of the drum supporting stud. Fig. 10— is a perspective view of the collar which works in conjunction with said bracket and stud. Fig. 11— is a sectional view illustrating the bracket, stud and collar assembled.

Referring to the drawings the device embodying the present invention is shown as applied to an automobile, 1 designating a portion of the frame or chassis thereof, and 2 a portion of one of the springs which is secured to the vehicle axle in a manner not shown, the spring being preferably directly connected at one end 3 to the frame, see Fig. 6, the opposite end being connected by a link or other suitable means, not shown.

The shock absorbing device comprises a body portion 4, preferably made in the form of a circular drum, which is constructed essentially of a side plate 5 having an outer annular flange 6 with a frictional engaging surface adapted to receive the friction band, hereinafter described. This body is adapted to turn freely on the bearing portion 7 of the stud 8, which latter is firmly secured against rotation in the bracket 9 by means of the retaining projection 10 arranged to fit into said bracket. A toothed ratchet wheel 11 is mounted on this pin 8 and is held firmly against rotation by being threaded thereon and screwed tightly up against the shoulder 13.

A plurality of pawls 14 are pivoted on the pins 15 secured to the back plate 5 of the body portion. These pawls are pressed into engagement with the teeth 16 of the ratchet by their respective springs 17, one end of each spring being fixed to the free end of each pawl. By the use of two pawls one may be set a little in advance of the other so that if one pawl should fail the other would be sure to catch the tooth and so reduce the back lash or lost motion while operating. Any desired number of pawls may be employed.

The space in the casing around the ratchet may be filled with grease or other lubricant, and an outer cover or plate 18 may be secured in position by means of the nut 19 on the outer end of the stud 8.

A jointed frictional brake band is provided for engaging the periphery of this body or drum, the same comprising an upper half 20 hinged at 21 to the lower half 22. This lower half is provided with an outwardly extending arm 23 to which is bolted a cap 24, a circular recess 25 being formed therein for the purpose of receiving the ball end 27 of the connecting rod 28. The neck of this connecting rod extends upward through the contracted opening 26. The upper end 29 of the rod is connected in a similar bracket 30, bolted at 31 to the chassis frame 1, whereby the connection 28 may have a universal movement to prevent any binding or cramping on the shock absorbing device, which is bound to be the case where a rigid connection is made between the chassis and the shock absorbing device, as the chassis sways or works about in its springs while traveling rapidly over rough roads. A small hood or flexible covering 69 of rubber, leather or other suitable material, may be attached to the lower end of the connection 28 for the purpose of closing the opening 26 and prevent dust and dirt from getting into the pocket which forms a bearing for the ball 27.

In order to nicely control the frictional grip and automatically compensate for the wear of this brake band on its drum, I have arranged a tension bolt 32, the head 33 of which engages a tension or wear take-up spring 34 set in the cup-shaped portion 35 of the arm 23, said bolt being threaded through the ear 36 of the upper half of the brake band where a washer 37, see Fig. 5, having a pointer 38 is keyed to turn with said screw 32 over a fixed graduated dial plate 39, the latter being provided with a slot 40 adapted to engage the rib 41 on the upper half of the band. A check nut 42 is provided to lock the whole in position.

In order to retain the brake band in position on the drum I have shown in Fig. 2, a central annular rib 43 on the drum which registers with a corresponding groove in the band, but I do not restrict myself to this construction as the face of the drum may be made angular, as shown at 44 in the modification illustrated in Fig. 3, for the purpose of retaining the band thereon, or any other suitable or convenient construction may be employed for this purpose.

I do not restrict myself to the mounting of the body portion of the shock absorbing device on the vehicle spring, as illustrated in Fig. 1, as said body portion may be supported above on the vehicle frame and through rod 28 be connected with the axle, or the same may be supported, as illustrated in Fig. 6, from a bracket 45 on an arm 46 and located between the chassis and the spring, the stud portion supporting the ratchet, in this case being connected to the bracket 47 on the chassis through the arm 48 in which position the operation of the device would be similar as when mounted in the manner illustrated in Fig. 1.

It is found in practice very essential to the successful action of the device that the same should be provided with one or more grease cups 49 for supplying the pockets 50, whereby a proper amount of lubrication may be forced therein to prevent abrasion or undue wearing of the frictional surfaces. An aperture 51 may also be provided whereby the interior of the drum may also be supplied with lubrication when necessary.

The stud 8 not only supports both the ratchet and the drum, the ratchet being held against rotation while the drum may rotate about said stud, but the said ratchet and drum are so held relatively to each other that there will always be an annular space between the ratchet and the inner wall of the drum for the pawls to work around in. Said space is closed by the cover 18 so that the pawls and the ratchet are protected against access of dirt or grit which would become mixed with the lubricant. In other words, the ratchet is inclosed within the drum, but so that there is an annular space between them, each being independently supported by the single central stud 8.

It is found in some cases where my improved shock absorber is attached to vehicles, that the motion of the vehicle is much easier and more elastic by providing a yielding flexible connection between the arm of the shock absorbing device and the spring supported vehicle frame. To accomplish this object I have provided a practical construction, as illustrated in Fig. 7, in which 52 is one member of the connection having a ball 53 at its upper end held in the bracket 54, the lower end of this upper member being provided with a collar 55 threaded thereon. The upper end 56 of the lower connection member 57 is preferably formed in a cup-shape with a cap 58 threaded at its upper end. The lower end of said member being also provided with a ball 59 held in the suitable socket in the end of the shock absorber arm 23. The end of the upper member is arranged to fit and work in the cup-shaped member of the lower member with a spring 60 confined between the collar 55 and the cap 58. I do not restrict myself to the particular construction above described, as a yielding connecting member constructed in any form may be employed for this purpose.

It is found in practice extremely difficult, under some conditions, to attach a shock absorbing device to a vehicle by means of the ordinary brackets. I have therefore designed an improved bracket, as illustrated in Fig. 8, grooved at 61 across its front face to receive the corresponding projection 10 on the retaining stud 8. This bracket is also open at 62 from its upper edge to allow said bearing stud to be positioned therein without being obliged to pass its ends through the longitudinal hole 63. A collar 64 is provided with a hole 65 through which the stud 8 projects, which collar is also provided with a forwardly extending block or portion 66 adapted to register with and fill the slot or opening 62 in the bracket 67. By this construction, when it is desired to attach the shock absorber to the vehicle it is only necessary to slacken the nut 68 and pass the shank of the stud down through the opening 62, after which the nut 68 is set up drawing the extension portion 10 into the recess 61 in its face, thus securely locking the whole in position. To remove the device it is only necessary to slacken this nut 68, slide forward the projecting portion 10 and withdraw the whole bodily through the slot 62 in the bracket.

The operation of the device may be more fully described as follows: In attaching my improved shock absorber to an automobile or other vehicle in the manner illustrated in Fig. 1, it is only necessary to bolt or strap the bracket 9 onto the spring 2, preferably over the axle, or in any other convenient position. The bolt 8 is positioned therein and the nut set up. The bracket 30 retaining the upper end of the loosely mounted connecting rod is bolted to the chassis and the device is then in position to be operated. Ordinarily one of these shock absorbers will be arranged to operate in conjunction with each spring making four in all. When the devices are received from the factory they are set at a given tension with the tension indicator 38 pointing at zero, and should this prove in operation to be too much or too little the same may be adjusted and nicely regulated to the requirements of each individual case, the extent of adjustment being visibly indicated by the pointer, which will readily enable the whole set to be regulated to a uniform tension. As the body portion or drum carrying the pawls is free to rotate on its axis it is turned forward by each downward motion of the vehicle body. At each return, or upward motion of the body, the pawls 14 engage the fixed ratchet wheel 16, positively preventing the backward movement of this drum whereby the friction band slips on the face thereof allowing the body portion to move upward or return slowly to its normal level. By this construction the brake drum always rotates in one direction causing the wear on its working surface to be perfectly uniform, and by the employment of the spring 34, whatever wear there may be is automatically taken up enabling my improved shock absorber to operate for a great length of time without adjustment, and by the employment of the yielding connecting member, illustrated in Fig. 7, the springs on the vehicle are so controlled as to impart to the spring supported body an extremely easy and flexible motion, even while riding over the roughest roads.

Having thus described my invention, what I claim as new and desire to secure by Letters Patent, is:

1. A shock absorber for vehicles comprising a fixed stud, a ratchet wheel supported by said stud, means for preventing rotation of said wheel on the stud, a friction drum independently and rotatably supported by said stud, an annular space being formed between the ratchet and inner wall of the drum, a pawl in said space and supported by the drum and engaging the ratchet, means for closing said annular space, a friction band surrounding said drum, and connections for causing the friction band to oscillate, whereby the friction drum will be intermittently rotated.

2. A shock absorber for vehicles comprising a fixed stud, a ratchet wheel supported by said stud, means for preventing rotation of said wheel on the stud, a friction drum independently and rotatably supported by said stud, an annular space being formed between the ratchet and inner wall of the drum, a pawl in said space and supported by the drum and engaging the ratchet, a cover mounted on said stud and having its margin fitting the drum whereby the annular space between the ratchet and the inner wall of the drum will be protected against access of dirt, a friction band surrounding said drum, and connections for causing the friction band to oscillate, whereby the friction drum will be intermittently rotated.

3. A shock absorber for vehicles comprising a supporting bracket, a stud mounted in said bracket and provided with means to prevent rotation relative to said bracket, a friction drum rotatably mounted on said stud, and provided with an annular flange, a ratchet wheel rigidly mounted on said stud and located within said flange, pawls carried by said drum and engaging said ratchet wheel, and a friction device engaging said flange.

4. A shock absorber for vehicles comprising a supporting bracket, a bearing stud mounted in said bracket and provided with means for preventing rotation relative to said bracket, said stud being provided with a threaded portion, a friction drum rotatably mounted on said stud, a ratchet wheel engaging said threaded portion and held against rotation thereby, pawls carried by said drum and engaging said ratchet wheel, and a friction device engaging said drum.

In testimony whereof I affix my signature in presence of two witnesses.

LUTHER A. PECKHAM

Witnesses:
HOWARD E. BARLOW,
E. I. OGDEN.